United States Patent
Nagai et al.

[11] Patent Number: 5,181,959
[45] Date of Patent: Jan. 26, 1993

[54] HIGH-CONCENTRATION STARCH ADHESIVE

[75] Inventors: Shigeki Nagai; Haruo Sato, both of Tokyo; Nagahisa Karube, Funabashi, all of Japan

[73] Assignee: Honshu Paper Co., Ltd., Tokyo, Japan

[21] Appl. No.: 458,179

[22] Filed: Dec. 28, 1989

[30] Foreign Application Priority Data

Dec. 28, 1988 [JP] Japan .................. 63-332216

[51] Int. Cl.$^5$ .................. C08L 3/00; C08J 3/02; C09D 4/00; C09D 101/00
[52] U.S. Cl. .................. 106/211; 106/210; 106/213; 156/336; 156/328; 524/47
[58] Field of Search .................. 106/210, 211, 213, 336, 106/328; 336/328; 524/47

[56] References Cited

U.S. PATENT DOCUMENTS

| | | | |
|---|---|---|---|
| 3,361,585 | 1/1968 | Armour et al. | 106/210 |
| 4,040,862 | 8/1977 | Voigt et al. | 106/210 |
| 4,073,756 | 2/1978 | Yotsuyanagi et al. | 106/170 |
| 4,157,318 | 6/1979 | Sadle et al. | 106/213 |
| 4,329,181 | 5/1982 | Chiu et al. | 106/210 |
| 4,343,654 | 8/1982 | Wave et al. | 106/210 |
| 4,814,039 | 3/1989 | Willging | 156/328 |
| 4,826,719 | 5/1989 | Murdock et al. | 156/328 |
| 4,855,354 | 8/1989 | Mohler et al. | 156/331.9 |

FOREIGN PATENT DOCUMENTS

234428A5  4/1986  Fed. Rep. of Germany.

*Primary Examiner*—Mark L. Bell
*Assistant Examiner*—C. M. Bonner
*Attorney, Agent, or Firm*—Seed and Berry

[57] ABSTRACT

The present invention relates to a high-concentration starch adhesive prepared by treating a starch slurry at a temperature of 100° C. or above to form a gelatinized solution and suspending an ungelatinized starch in the gelatinized solution. According to the present invention, the viscosity of the starch adhesive can be kept stable over a long period of time; the problems such as warp due to the expansion and contraction, by the absorption of water, of the material to be adhered, can be solved; and the quantity of heat necessitated in the adhesion step can be much reduced.

6 Claims, No Drawings

HIGH-CONCENTRATION STARCH ADHESIVE

BACKGROUND OF INVENTION

The present invention relates to a high-concentration starch adhesive having a high concentration of starch and having a viscosity stable over a long period of time and a process for preparing it.

In the paper-converting industry, an adhesive prepared by dispersing starch in water, an alcohol or the like and gelatinizing it by heat, steam or the like is usually used. It is difficult to prepare the starch adhesive having a high concentration, because its viscosity becomes high at a low temperature. To obtain the high-concentration starch adhesive, the gelatinized solution must be kept warm or a modified starch or dextrin is necessary to be used as a carrier. The keeping of the starch warm requires the equipments thereof, and the use of the processed starch or dextrin pose problems such as high costs and lowering of the adhesive power.

A laminating adhesive having a relatively high concentration used in the production of corrugated boards is prepared by a Stein-hall method (hereinafter referred to as SH method) wherein a carrier part comprising a starch paste completely gelatinized by an alkali and heat is mixed with a main part which is an ungelatinized starch.

The carrier used for maintaining the main starch, preventing the gelation and increasing the fluidity is prepared by adding sodium hydroxide to raw starch, processed starch or high-amylose starch, the amount of sodium hydroxide being 10 to 16% by weight based on the starch, and dissolving the starch by heat at 50° to 60° C. However, a carrier concentration higher than 15% can not be obtained, because the viscosity is high even in the presence of sodium hydroxide. Further, although the stable paste can be obtained in the initial stage of the preparation, the main starch is gradually swollen with sodium hydroxide contained in the carrier to increase the viscosity. Therefore, the main starch concentration is limited. Under these circumstances, the maximum total starch concentration of the adhesives prepared by the SH method is 25%.

Such a low-concentration adhesive containing a high water content reduces the adhesion speed and retards the drying of the adhesive layer in the adhesion step. Thus, the material to be adhered, such as paper is swelled by the absorption of water, to cause problems such as warp. Another problem of the low-concentration adhesive is that a lot of energy is necessitated for the evaporation of water.

Various methods were proposed for stabilizing the viscosity of the adhesives prepared by the SH method and increasing the concentration thereof. For example, a method wherein raw starch is mixed with an acid-treated starch, oxidized starch or dextrin to form a carrier part [Japanese Patent Publication for Opposition Purpose (hereinafter referred to as 'J.P. KOKOKU') No.55-35076)], a method wherein an etherified starch or oxidized starch with hypochlorite is used for preparing the carrier part (J.P. KOKOKU Nos.54-1575 and 56-43268), and a method wherein starch is oxidized with perborate to form a low-viscosity carrier [Japanese Patent Unexamined Published Application (hereinafter referred to as 'J.P. KOKAI') No.56-129278]. In these methods, the viscosity of the carrier part is reduced by the oxidation or the like to increase the concentration of the adhesive. However, even when sodium hydroxide is used in these methods, a concentration higher than 30% cannot be obtained. In addition, the adhesive power is reduced by the oxidation of the carrier starch. In another method wherein a high-amylose starch is used as a carrier starch the increase of the relative amount of amylose in the high-amylose starch is limited in view of breeding and, in addition, when the relative amount of amylose is increased, the paste is seriously gelled at a low temperature. Under these circumstances, the lightly oxidized starch or low-viscosity high-amylose starch is frequently used as a high-concentration carrier. However, even in such a case, the addition of a strong alkali such as NaOH or KOH in a large amount is indispensable for inhibiting the gelation of the paste to keep the fluidity and increasing the main keeping capacity. When such an alkali is used, the ungelatinized main starch added to the carrier part is swollen with the alkali used in a large amount, to make the viscosity of the adhesive unstable. A method wherein a modified starch is formed under high pressure is disclosed in J.P. KOKAI No.51-151345. However, the product has a high viscosity even at a high temperature and it cannot be used as an adhesive at ambient temperature.

SUMMARY OF INVENTION

The object of the present invention is, therefore, to provide a high-concentration starch adhesive having the following advantages: the adhesion step can be completed rapidly; the problems of the quality due to the swelling and drying of the material to be adhered caused by water can be solved; the quantity of heat necessitated in the adhesion step can be reduced; and the viscosity thereof after the mixing with the main starch is unchanged with the lapse of time.

After intensive investigations made for the purpose of attaining the above-described object, the inventors have found out that the object can be attained by treating a starch slurry at a temperature of 100° C. or above to form a gelatinized solution and suspending an ungelatinized starch in the gelatinized solution to form a high-concentration starch adhesive. The inventors have also found out that the object of the invention can be attained surely by adding a fatty acid monoester or diester of polyethylene glycol or an aldehyde. The present invention has been completed on the basis of these findings. The inventors have further found out that the starch slurry per se treated at 100° C. or above is also useful as a high-concentration starch adhesive.

DETAILED DESCRIPTION OF THE INVENTION

The starch used in the present invention may be any of those usually used in the SH method. They include, for example, corn, wheat, rice, potato, sweet potato, tapioca and sago starches as well as oxidized materials thereof, cationic starches, etherified starches and esterified ones. Water, an alcohol or a mixture of them is used for preparing the slurry of the starch. The alcohol is, for example, ethanol or methanol.

The carrier concentration in the present invention can be the maximum concentration so far as the starch can be dispersed in a slurry-forming liquid such as water and as far as it can be transferred in the form of liquid. It is, for example, 30 to 60%.

The gelatinization temperature is 100° C. or above, preferably 150° C. or above but lower than 210° C. At a temperature lower than 150° C., the viscosity of the starch is lowered and, on the contrary, at 210° C. or above, excess decomposition occurs. Usually the starch is gelatinized with vapor of water or the like at 100° to 180° C. by means of a jet cooker. The vapor is not immediately liquified and it does not reduce the viscosity of the starch in such a case.

The gelatinization time is usually 5 to 150 min.

The fatty acid esters of polyethylene glycol usable in the present invention are monoesters or diesters of the following general formulae:

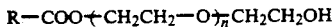

or

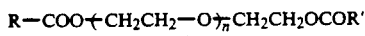

wherein n is preferably 10 to 200, and R and R' each represents a saturated or unsaturated aliphatic group having 7 to 31 carbon atoms.

The amount of the fatty acid ester of polyethylene glycol used is preferably 0.1 to 5% by weight based on the starch. When it is less than 0.1% by weight, the stable and gelatinized carrier having a high concentration cannot be easily obtained and, on the contrary, more than 5% by weight of the ester is economically disadvantageous.

The aldehydes usable in the present invention include water-soluble aliphatic saturated aldehydes such as formaldehyde, acetaldehyde, propionaldehyde, butylaldehyde and isobutylaldehyde; aliphatic dialdehydes such as glyoxal; aliphatic unsaturated aldehydes such as acrolein, crotonaldehyde and propiolaldehyde; and aromatic aldehydes such as benzaldehyde. From the viewpoints of the stabilization effect and economical factors, the amount of the aldehyde to be used is preferably 0.1 to 10% by weight based on the starch.

When the above various additives are used in the present invention, the viscosity can be surely lowered and the time required for the heat treatment is shorter than that required when they are not used.

The fatty acid monoester or diester of polyethylene glycol and the aldehyde are preferably added to the unheated starch slurry to be used as a starting material for the carrier.

The lowering of the viscosity can be accelerated by adding 0.01 to 2% by weight, based on the starch, of an acid such as sulfuric acid, hydrochloric acid, phosphoric acid, metaphosphoric acid or boric acid or an oxidizing agent such as a persulfate or perborate, to the starch slurry. However, when the slurry is treated with the acid or oxidizing agent, the starch is apt to be aged, which usually leads to the deterioration of the affinity to the paper or of the adhesive power.

When the above-described fatty acid ester of polyethylene glycol or aldehyde is added to the starch slurry, the gelatinized starch has a high viscosity stability, a high fluidity and a high power of maintaining the main at a temperature widely ranging from low to high temperature.

The concentration of the gelatinized solution (carrier) thus obtained can be increased to 60% and the viscosity thereof is variable over a wide range of 100 to 100,000 cps by varying the treatment temperature and time. Even when the concentration is increased to 60%, the viscosity is changeable depending on the temperature change and it does not gel or lose its fluidity even at room temperature.

The high-concentration gelatinized solution (carrier) can be used as an adhesive as it is. Further, the high-concentration starch adhesive can be prepared by mixing the carrier with the main wherein the starch is suspended, or by directly throwing the starch powder into the carrier.

When the carrier per se is used as an adhesive, the viscosity thereof must be reduced by heating for a relatively long period of time. In this case, usually the concentration is 10 to 50%, gelatinization temperature is 100° to 210° C. and gelatinization time is 5 to 150 min. and, preferably, the concentration is 30 to 40%, the gelatinization temperature is 150° to 210° C. and the gelatinization time is 30 to 150 min. The viscosity is desirably 500 to 2500 cps.

Borax, boric acid or the like can be added to the adhesive to increase green bonding or a small amount of an alkali such as sodium hydroxide can be added thereto in order to improve the paper-wetting properties or to lower the gelatinization temperature of the main starch.

The following examples will further illustrate the present invention.

EXAMPLE 1

40 parts of corn starch was mixed with 60 parts of water to form a starch suspension, which was passed through a reaction tube having a diameter of 12.7 mm and a length of 3760 mm, which tube was heated at 180° C., by means of a pump having an outlet pressure of 15 kgf/cm$^2$ and a feeding rate of 6.5 ml/min. for 73 min., to obtain a carrier having a concentration of 40% and a Brookfield viscosity of 2150 cps (30° C.). On the other hand, 20 parts of corn starch was mixed with 30 parts of water to form a main having a concentration of 40%. 50 parts of the carrier prepared as described above was added thereto under stirring to obtain Starch Adhesion A having a total starch concentration of 40%.

EXAMPLE 2

35 parts of corn starch was mixed with 65 parts of water to form a starch suspension, which was passed through a reaction tube having a diameter of 12.7 mm and a length of 3760 mm, which tube was heated at 160° C., by means of a pump having an outlet pressure of 12 kgf/cm$^2$ and a feeding rate of 3.4 ml/min. for 140 min. to obtain a carrier having a concentration of 35% and a Brookfield viscosity of 4350 cps (30° C.). On the other hand, 22 parts of corn starch was mixed with 33 parts of water to form a main having a concentration of 40%. 45 parts of the carrier prepared as described above was added thereto under stirring to obtain Starch Adhesive B having a total starch concentration of 38%.

Starch Adhesives A and B were used for laminating corrugated boards at the double facer side. The results are shown in Table 1.

EXAMPLE 3

40 parts of corn starch was mixed with 60 parts of water. 0.5%, based on the solid starch, of polyethylene glycol/stearic acid diester was added to the mixture to form a starch suspension, which was passed through a reaction tube having a diameter of 12.7 mm and a length of 3760 mm, which tube was heated at 180° C., by means of a pump having an outlet pressure of 12 kgf/cm$^2$ and a feeding rate of 40 ml/min. for 11.9 min., to obtain a carrier having a concentration of 40% and a Brookfield viscosity of 9740 cps (30° C.) On the other hand, 26.7 parts of corn starch was mixed with 40 parts of water to form a main having a concentration of 40%. 33.3 parts of the carrier prepared as described above was added thereto under stirring to obtain Starch Adhesive C having a total starch concentration of 40%.

EXAMPLE 4

30 parts of corn starch was mixed with 70 parts of water. 1.0%, based on the solid starch, of glyoxal was added to the mixture to form a starch suspension, which was passed through a reaction tube having a diameter of 12.7 mm and a length of 3760 mm, which tube was heated at 180° C., by means of of a pump having an outlet pressure of 12 kgf/cm$^2$ and a feeding rate of 62.5 ml/min. for 7.6 min. to obtain a carrier having a concentration of 30% and a Brookfield viscosity of 25,700 cps (30° C.). On the other hand, 33.3 parts of corn starch was mixed with 43.7 parts of water and 0.8 part of borax, to form a main. 22.2 parts of the carrier prepared as described above was added thereto under stirring to obtain Starch Adhesive D having a total starch concentration of 40%.

Starch Adhesives C and D were used for laminating corrugated boards at the double facer side. The results are shown in Table 2.

TABLE 1

|  | Example 1 A | Example 2 B |
|---|---|---|
| Starch concentration (%) | 40 | 38 |
| Brookfield viscosity (cps) | 335 | 296 |
| Viscosity stability | good | good |
| Adhesive added (wet) (g/m$^2$) | 12.5 | 12.2 |
| Adhesive strength (kgf) (double facer side) | 26.9 | 25.6 |
| Green bonding | ⊚ | ⊚ |
| Warp | none | none |
| Drying energy (kcal/m$^2$) | 2.23 | 2.31 |

Note 1) Combination: K220 × SCP125 × K220 A flute
Note 2) Adhesive strength: JIS Z 0402
Note 3) Green bonding: determined from the shearing adhesive power at the double facer side by peeling the boards, 20 sec. after the lamination.

TABLE 2

|  | Example 3 C | Example 4 D | SH method |
|---|---|---|---|
| Starch concentration (%) | 40 | 40 | 22 |
| Brookfield viscosity (cps) | 153 | 523 | 350 |
| Viscosity stability | good | good | bad |
| Adhesive added (wet) (g/m$^2$) | 12.5 | 12.0 | 22.7 |
| Adhesive strength (kgf) (double facer side) | 27.1 | 25.8 | 25.6 |
| Green bonding | ⊚ | ⊚ | ∘ |
| Warp | good | good | bad |
| Drying energy (kcal/m$^2$) | 2.23 | 2.24 | 2.47 |

Note 1) Combination: K220 × SCP125 × K220 A flute
Note 2) Adhesive strength: JIS Z 0402
Note 3) Green bonding: determined from the shearing adhesive power at the double facer side by peeling the boards, 20 sec. after the lamination.

EXAMPLES 5 TO 9

The same procedure as that of Example 3 was repeated except that a monoester or diester shown in the following Table 3 was used as a fatty acid monoester or diester of polyethylene glycol represented by the following formula and that the conditions shown in Table 3 were employed, and the properties of the paste thus formed were examined:

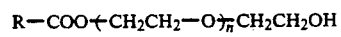

or

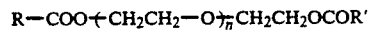

For comparison, a starch adhesive was prepared by the conventional SH method and the properties thereof are also shown in Table 3.

It is apparent from Table 3 that the adhesives of the present invention have a higher concentration and more excellent viscosity stability than those of the adhesive prepared by the SH method.

TABLE 3

|  | Example 5 | Example 6 | Example 7 | Example 8 | Example 9 | SH method |
|---|---|---|---|---|---|---|
| (Preparation of carrier) | | | | | | |
| Concentration (%) | 40 | 40 | 40 | 25 | 30 | |
| Ester added n | 10 | 200 | 190 | 200 | 140 | |
| carbon number of R or R' | 7 | 31 | 17 | 17 | 11 | |
|  | Caprylic ester (diester) | Lacceric ester (monoester) | Stearic ester (monoester) | Oleic ester (monoester) | Lauric ester (diester) | |
| Amount of diester or monoester (%) | 3 | 1 | 0.1 | 0.2 | 0.1 | |
| Reaction temperature (°C.) | 170 | 190 | 180 | 180 | 200 | |
| Feeding rate (ml/min.) | 7.9 | 32 | 40 | 36.6 | 30 | |
| Feeding pressure (kgf/cm$^2$) | 12 | 15 | 13 | 13 | 16 | |
| Reaction time (min.) | 60 | 7.3 | 11.9 | 15.2 | 5.2 | |
| Carrier viscosity (cps) | 2300 | 7230 | 4500 | 112000 | 37500 | |
| (Preparation of adhesive) | | | | | | |
| Main concentration (%) | 40 | 40 | 40 | 57 | 45 | |
| Amount of main (parts) | 66.7 | 80 | 80 | 46.7 | 66.7 | |
| Amount of carrier (parts) | 33.3 | 20 | 20 | 53.3 | 33.3 | |
| Concentration of adhesive (%) | 40 | 40 | 40 | 40 | 40 | |
| (Results of lamination) | | | | | | |
| Concentration of adhesive (%) | 40 | 40 | 40 | 25 | 30 | 22 |
| Brookfield viscosity (cps) | 120 | 153 | 250 | 245 | 523 | 350 |
| Viscosity stability | good | good | good | good | good | bad |
| Adhesive added (wet) (g/m$^2$) | 12 | 12 | 12 | 12 | 12 | 22.7 |
| Adhesive strength (kgf) | 27.1 | 25.8 | 24.9 | 28.0 | 26.6 | 25.6 |
| Green bonding | ⊚ | ⊚ | ⊚ | ⊚ | ⊚ | |
| Warp | none | none | none | none | none | warp |

Note 1) Combination: K220 × SCP125 × K220 A flute
Note 2) Adhesive strength: JIS Z 0402
Note 3) Determined from the shearing adhesive power at the double facer side by peeling the boards, 10 sec. after the lamination

EXAMPLES 10 TO 13

The same procedure as that of Example 4 was repeated except that an aldehyde shown in Table 4 was used and that the conditions shown in Table 4 were employed, and the properties of the paste thus formed were examined. For comparison, a starch adhesive was prepared by the conventional SH method and the properties thereof were also determined. The results are shown in Table 4.

It is apparent from Table 4 that the adhesives of the present invention have a more excellent viscosity stability than that prepared by the conventional SH method, although its concentration is higher than that of the latter.

TABLE 4

|  | Example 10 | Example 11 | Example 12 | Example 13 | SH method |
|---|---|---|---|---|---|
| (Preparation of carrier) | | | | | |
| Concentration (%) | 40 | 40 | 40 | 30 | |
| Aldehyde added | Formalin | Glyoxal | Acrolein | Benzaldehyde | |
| Amount added (%) | 1 | 1 | 5 | 9 | |
| Reaction temperature (°C.) | 180 | 190 | 200 | 180 | |
| Feeding rate (ml/min.) | 31 | 35 | 34 | 40 | |
| Feeding pressure (kgf/cm$^2$) | 13 | 15 | 16 | 13 | |
| Reaction time (min.) | 15.4 | 13.6 | 14.0 | 11.9 | |
| Carrier viscosity (cps) | 5450 | 7460 | 8050 | 11500 | |
| (Preparation of adhesive) | | | | | |
| Main concentration (%) | 40 | 40 | 40 | 45 | |
| Amount of main (parts) | 80 | 80 | 80 | 66.7 | |
| Amount of carrier (parts) | 20 | 20 | 20 | 33.3 | |
| Concentration of adhesive (%) | 40 | 40 | 40 | 40 | |
| (Results of lamination) | | | | | |
| Concentration of adhesive (%) | 40 | 40 | 40 | 40 | 22 |
| Brookfield viscosity (cps) | 230 | 351 | 665 | 750 | 350 |
| Viscosity stability | good | good | good | good | bad |
| Adhesive added (wet) (g/m$^2$) | 12 | 12 | 12 | 12 | 22.7 |
| Adhesive strength (kgf) | 27.5 | 26.0 | 28.0 | 26.1 | 24.8 |
| Green bonding | ⊙ | ⊙ | ⊙ | ⊙ | o |
| Warp | none | none | none | none | warp |

Note 1) Combination: K220 × SCP125 × K220 A flute
Note 2) Adhesive strength: JIS Z 0402
Note 3) Green bonding: determined from the shearing adhesive power at the double facer side by peeling the boards, 10 sec. after the lamination.

EXAMPLES 14 TO 16 AND COMPARATIVE EXAMPLE 1

These example and comparative example relate to, a starch adhesive comprising only a carrier was prepared.

Starch suspensions having a starch concentration shown in Table 5 were prepared as Examples 14 to 16 and Comparative Example 1. Then, the same procedure as that of Example 1 was repeated in Example 14, the same procedure as that of Example 3 was repeated in Example 15 and the same procedure as that of Example 4 was repeated in Example 16 except that the gelatinization temperature was changed to 200° C. to form carriers. On the other hand, a carrier was prepared in Comparative Example 1 in the same manner as that of Example 1 except that the dissolution was conducted under atmospheric pressure.

The properties of the carrier adhesives thus obtained are shown in Table 5.

TABLE 5

|  | Example 14 | Example 15 | Comparative Example 1 (Dissolution under atmospheric pressure) | Example 16 |
|---|---|---|---|---|
| Starch concentration | 30% | 40% | 6% | 40% |
| Additive | None | 0.5% of polyoxyethylene laurate | None | 1% of formaldehyde |
| Brookfield viscosity | 1325 cps | 1376 cps | 1512 cps | 1390 cps |
| Adhesive added (solid) | 25.4 g/m$^2$ | 24.8 g/m$^2$ | 25.0 g/m$^2$ | 25.0 g/m$^2$ |
| Peeling strength | 2.56 kgf | 2.72 kgf | 0.64 kgf | 2.61 kgf |
| Breakage immediately after the lamination | The whole paper layers were broken | The whole paper layers were broken | The surface layer was broken | The whole paper layers were broken |
| Warp of the paper after two days | None | None | Warp | None |

1) Sample: RK220 × SCP125
2) Press conditions: pressed under a load of 0.3 kgf/cm$^2$ at 170° C. for 3 sec.
3) Peeling strength: determined according to JIS K 6854 (width: 20 mm)

By peeling the layers immediately after the lamination, it was revealed that the paper layers were deeply and firmly adhered in Examples 14 to 16. On the contrary, the sample in the comparative example had a high water content and the adhesion was insufficient.

After air-drying for two days, a warp was observed in Comparative Example 1.

EXAMPLE 17

30 parts of corn starch was mixed with 70 parts of water. 0.1% of a stearic monoester (the alkyl group has 17 carbon atoms) was added to the mixture, and was passed through a reaction tube having a diameter of 12.7 mm and a length of 3760 mm, which tube was heated to 130° C., by means of a pump having an outlet pressure of 10 kgf/cm² and a feeding rate of 1.1 ml/min. for 433 min. to obtain a carrier having a concentration of 30% and a Brookfield viscosity of 87,500 cps (30° C.). On the other hand, 40 parts of corn starch was mixed with 60 parts of water to form the main having a concentration of 40%. 20 parts of the carrier prepared as described above was added thereto under stirring to obtain Starch Adhesive E having a total starch concentration of 32%.

Starch Adhesive E was used for laminating corrugated boards at a double facer side. The results are shown in Table 6.

TABLE 6

|  | Example 17 E |
| --- | --- |
| Starch concentration (%) | 32 |
| Brookfield viscosity (cps) | 720 |
| Viscosity stability | good |
| Coating amount (wet) (g/m²) | 12.0 |
| Adhesive strength (kgf) (double facer side) | 25.7 |
| Initial adhesive power | ⊚ |
| Warp | none |
| Drying energy (kcal/m²) | 2.31 |

Note 1) Paper structure: K220 × SCP125 × K220 A flute
Note 2) Adhesive strength: JIS Z 0402
Note 3) Initial adhesive power: determined from the shearing adhesive power at the double facer side by peeling the boards, 20 sec. after the lamination.

A paste having a high concentration and a low viscosity has been prepared by treatment with an oxidizing agent in the prior art. In this process, however, the molecule of the starch dissolved in water is gradually cut from its end and, therefore, the product has a quite low molecular weight and a very low adhesive power. Another reason is that the pyranose ring is cut. Although the mechanism has not been theoretically elucidated, the adhesive power can be kept in the present invention because the starch molecule is cut at any desired portion by only heat at high temperature in a short period of time and because the glycoside bond is cut by the thermal decomposition.

According to the present invention, the carrier having a high concentration is prepared by gelatinizing a starch at high temperature of 100° C. or above and it is mixed with the main to form the adhesive having a viscosity which can be kept stable over a long period of time. The adhesive thus formed can be stored and reused conveniently. The present adhesion helps make rapid the processing of a paper or the preparation of a corrugated board. Another advantage of the invention is that the problems of the quality, such as warp due to the expansion and contraction of the material to be adhered, caused by the absorption of water, can be solved and the quantity of heat necessitated in the adhesion step can be much reduced.

What is claimed is:

1. A high-concentration starch adhesive prepared by treating a starch slurry at a temperature of 100° C. or higher to form a gelatinized solution having a starch concentration of 30–60% by weight, and then suspending an ungelatinized starch in said gelatinized solution, said high-concentration starch slurry containing a fatty acid monoester or diester of a polyethylene glycol having the following formula:

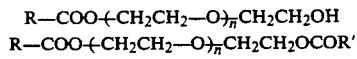

wherein n represents a numeral of 10–200, and R and R' each represents a saturated or unsaturated aliphatic group having 7–31 carbon atoms.

2. The high-concentration starch adhesive of claim 1, wherein said temperature is 150°–200° C.

3. The high-concentration starch adhesive of claim 1, wherein said fatty acid monester or diester is contained in an amount of 0.1–5% by weight based on the total weight of starch.

4. A high-concentration starch adhesive prepared by treating a starch slurry at a temperature of 100° C. or higher to form a gelatinized solution having a starch concentration of 30–60% by weight, said high-concentration starch slurry containing a fatty acid monester or diester of a polyethylene glycol having the following formula:

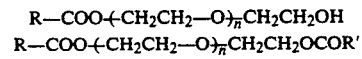

wherein n represents a numeral of 10–200, and R and R' each represents a saturated or unsaturated aliphatic group having 7–31 carbon atoms.

5. The high-concentration starch adhesive of claim 4, wherein said temperature is 150°–200° C.

6. The high-concentration starch adhesive of claim 4, wherein said fatty acid monoester or diester is contained in an amount of 0.1–5% by weight based on the total weight of starch.

* * * * *